United States Patent [19]
White, Jr.

[11] 3,894,007
[45] July 8, 1975

[54] 2-[(2,4-DIOXO-1-IMIDAZOLIDINYL)IMINO]ETHYL-P-CHLOROBENZOATE

[75] Inventor: Ralph L. White, Jr., Norwich, N.Y.

[73] Assignee: Morton-Norwich Products, Inc., Norwich, N.Y.

[22] Filed: Jan. 25, 1974

[21] Appl. No.: 436,465

[52] U.S. Cl. .......... 260/240 G; 260/309.5; 424/273
[51] Int. Cl. ............................................ C07d 49/32
[58] Field of Search ..................... 260/240 G, 309.5

[56] References Cited
UNITED STATES PATENTS

| | | | |
|---|---|---|---|
| 3,157,645 | 11/1964 | Spencer | 260/309.5 |
| 3,300,510 | 1/1967 | Alburn et al. | 260/309.5 |
| 3,748,326 | 7/1973 | Schwan et al. | 260/240 G |
| 3,830,805 | 8/1974 | Pilgram | 260/309 |

OTHER PUBLICATIONS

March, Advanced Organic Chemistry; Reactions, Mechanisms & Structure, McGraw Hill; N.Y., N.Y., 1968, p. 323.

Wagner et al., Synthetic Organic Chemistry, John Wiley & Sons, N.Y., N.Y., 1953, p. 484.

*Primary Examiner*—Arthur P. Demers
*Attorney, Agent, or Firm*—Anthony J. Franze

[57] ABSTRACT

The title compound is a useful anthelmintic.

3 Claims, No Drawings

2-[(2,4-DIOXO-1-IMIDAZOLIDINYL)IMINO]ETHYL-P-CHLOROBENZOATE

This invention relates to chemical compounds. More particularly it relates to the compound 2-[(2,4-dioxo-1-imidazolidinyl)imino]ethyl-p-chlorobenzoate (A) and the compound 1-[(2-chloroethylidene)amino]hydantoin useful as an intermediate in the preparation thereof.

The compound (A) is useful as an anthelmintic. When administered per os in a dose of 100 mg/kg by gavage as a suspension in aqueous sodium carboxymethyl cellulose to mice harboring the pinworm Syphacia obvelata, reduction of pinworm population is achieved.

In order that this invention may be readily available to and understood by those skilled in the art, the following example of its preparation is set forth:

A. 1-[(2-Chloroethylidene)amino]hydantoin

In 400 ml of water was dissolved 91 g (0.60 mole) of 1-aminohydantoin hydrochloride. To this solution at 35° was added 150 ml of 30 percent chloroacetaldehyde (0.57 mole). A white precipitate resulted and the mixture was stirred without heating for 10 hr. The collected solid was recrystallized from 400 ml of nitromethane to give 76 g (72 percent) of amber crystals, m.p. 160°–162°.

A 2.0 g sample recrystallized from 40 ml of nitromethane gave m.p. 158°–160°.

Anal. Calcd. for $C_5H_6ClN_3O_2$: C, 34.20; H, 3.44; N, 23.94.

Found: C, 34.20; H, 3.46; N, 23.99.

B. 2-[(2,4-Dioxo-1-imidazolidinyl)imino]ethyl p-Chlorobenzoate

In a 2.0 l flask were placed p-chlorobenzoic acid (16 g, 0.10 mole), A. (19 g, 0.10 mole), potassium carbonate (12.0 g), sodium iodide (2.0 g) and acetone (1.0 l). The stirred mixture was refluxed for five hours and concentrated under reduced pressure to a solid. Water (500 ml) was added and the solution pH was adjusted to pH=6 with dilute hydrochloric acid. The resulting solid was collected and air-dried.

Recrystallization from acetonitrile (150 ml) yielded white solid (12 g, 40 percent), m.p. 180°–182°.

Anal. Calcd. for $C_{12}H_{10}ClN_3O_4$: C, 48.74; H, 3.41; N, 14.21.

Found: C, 48.71; H, 3.48; N, 14.52.

What is claimed is:

1. A compound of the formula:

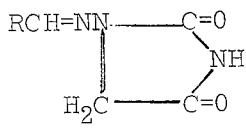

wherein R is $ClCH_2-$ or

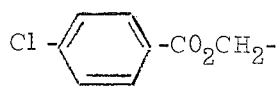

2. The compound 2-[(2,4-dioxo-1-imidazolidinyl)imino]ethyl-p-chlorobenzoate.

3. The compound 1-[(2-chloroethylidene)amino]hydantoin.

* * * * *